US009894633B2

(12) United States Patent
Hobbs et al.

(10) Patent No.: US 9,894,633 B2
(45) Date of Patent: Feb. 13, 2018

(54) REMINDERS BASED ON DEVICE PROXIMITY USING BLUETOOTH LE

(71) Applicant: GOOGLE INC., Mountain View, CA (US)

(72) Inventors: Nicholas Kenneth Hobbs, San Francisco, CA (US); Randall Cole Luecke, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 11 days.

(21) Appl. No.: 14/166,335

(22) Filed: Jan. 28, 2014

(65) Prior Publication Data

US 2015/0163765 A1 Jun. 11, 2015

Related U.S. Application Data

(60) Provisional application No. 61/912,703, filed on Dec. 6, 2013.

(51) Int. Cl.

| | |
|---|---|
| ***H04B 7/00*** | (2006.01) |
| ***H04W 64/00*** | (2009.01) |
| ***G06Q 10/10*** | (2012.01) |
| ***H04W 8/00*** | (2009.01) |
| ***H04W 4/00*** | (2009.01) |
| ***H04W 4/20*** | (2009.01) |

(52) U.S. Cl.

CPC .......... *H04W 64/00* (2013.01); *G06Q 10/109* (2013.01); *H04W 4/008* (2013.01); *H04W 4/206* (2013.01); *H04W 8/005* (2013.01)

(58) Field of Classification Search

CPC ..... H04W 4/008; H04W 8/005; H04W 12/06; H04W 48/16

USPC ........................................................ 455/41.2

See application file for complete search history.

(56) References Cited

U.S. PATENT DOCUMENTS

| | | | |
|---|---|---|---|
| 2005/0273493 | A1 | 12/2005 | Buford et al. |
| 2006/0288347 | A1 | 12/2006 | Jemiolo et al. |
| 2007/0167136 | A1 | 7/2007 | Groth |

(Continued)

FOREIGN PATENT DOCUMENTS

| | | | |
|---|---|---|---|
| DE | 10-2008-037021 | A1 | 2/2010 |
| EP | 2000961 | A1 | 12/2008 |
| WO | 2015/085091 | A1 | 6/2015 |

OTHER PUBLICATIONS

"Adomaly: 1st Mobile Ad Network built on Apple iBeacon & Sonic sBeacon Technology", retrieved on Sep. 3, 2013 from https://adomaly.com/, 6 pages.

(Continued)

*Primary Examiner* — Raj Chakraborty

(74) *Attorney, Agent, or Firm* — Middleton Reutlinger

(57) ABSTRACT

In one general aspect, a method can include identifying, by a computing device, a geographic proximity of an entity, establishing, by the computing device, direct short-range communications with the entity, the computing device and the entity being able to communicate with one another using a short-range communication protocol. The method can further include receiving, by the computing device, an indication that the computing device shares an identifier with the entity, and receiving, by the computing device, information relevant to the computing device regarding the entity based on the shared identifier.

18 Claims, 10 Drawing Sheets

(56) References Cited

U.S. PATENT DOCUMENTS

| | | | | |
|---|---|---|---|---|
| 2008/0301567 | A1* | 12/2008 | Martin | G06Q 10/109 715/751 |
| 2009/0131079 | A1* | 5/2009 | Sekhar | H04W 4/02 455/456.3 |
| 2010/0295676 | A1 | 11/2010 | Khachaturov et al. | |
| 2013/0065584 | A1 | 3/2013 | Lyon et al. | |
| 2013/0106684 | A1* | 5/2013 | Weast | G06F 19/3481 345/156 |
| 2013/0161381 | A1* | 6/2013 | Roundtree | G06Q 30/0207 235/375 |
| 2013/0203445 | A1 | 8/2013 | Grainger et al. | |
| 2013/0210461 | A1 | 8/2013 | Moldaysky et al. | |
| 2014/0067958 | A1* | 3/2014 | Bradley | G06Q 30/0241 709/204 |
| 2014/0206391 | A1* | 7/2014 | Perotti | H04L 67/26 455/456.3 |

OTHER PUBLICATIONS

AppleInsider Staff, "Bluetooth devices to gain notification support in iOS 7 & Mavericks with Apple's new APIs", Jun. 13, 2013, 6 pages.

"Frequently Asked Questions", The Bump App for iPhone and Android, Bump Technologies, Inc., retrieved on Sep. 2, 2013 from http://bu.mp/company/faq, 7 pages.

"What is S Beam, and how do I use it?", AT&T Cell Phones, How-To Guides, Apr. 12, 2012, 5 pages.

"ZOMM Wireless Leash for Mobile Phones, Bluetooth Speakerphone, and Personal Safety Device—White", Amazon, com,, Sep. 2, 2013, 6 pages.

Daniel Eran Dilger, "Inside iOS 7: iBeacons enhance apps' location awareness via Bluetooth LE", AppleInsider, Jun. 19, 2013, 8 pages.

Gupta, et al., "PeerSense: Who is near you?", IEEE Xplore, IEEE International Conference on Pervasive Computing and Communications Workshops, Mar. 2012, retrieved on Sep. 3, 2013, 2 pages.

Christian Zibreg, "iOS 7 simplifies file sharing with AirDrop", retrieved from http://www.idownloadblog.com/2013/06/10ios-7-airdrop/, Jun. 10, 2013, 2 pages.

International Search Report and Written Opinion for PCT Patent Application No. PCT/US2014/068620, dated Mar. 5, 2015, 11 pages.

International Preliminary Report on Patentability for PCT Patent Application No. PCT/US2014/068620, dated Jun. 16, 2016, 8 pages.

* cited by examiner

REMINDERS BASED ON DEVICE PROXIMITY USING BLUETOOTH LE

CROSS REFERENCE TO RELATED APPLICATION

This application is a Nonprovisional of, and claims priority to, U.S. Patent Application No. 61/912,703, filed on Dec. 6, 2013, entitled "REMINDERS BASED ON DEVICE PROXIMITY USING BLUETOOTH LE", which is incorporated by reference herein in its entirety.

TECHNICAL FIELD

This description generally relates to computing devices. The description, in particular, relates to determining the proximity of two computing devices.

BACKGROUND

A computing device can provide contextual information to a user of the computing device. For example, a mobile computing device can provide a user with the nearest location of a coffee shop based on identifying the current location of the user (e.g., using Global Positioning System (GPS) coordinates) and based on a request by the user for a coffee shop near their current location. The mobile computing device can provide the user with the address of the identified local coffee shop. In another example, a computing device can provide a user with a reminder for a scheduled meeting based on identifying the time of day and based on a calendar entry for the meeting. The computing device can provide the user with a reminder indicator for the meeting (e.g., display a message on a display screen of the computing device and, in some cases, produce an audible prompt).

In the above examples, a computing device identifies a location of the user and a current time of day. The computing device, however, may be limited as to its ability to provide additional contextual information to the user. The additional contextual information may be based on, for example, whom the user may be with at the time, and what may be present in the proximate surroundings of the user (e.g., businesses, restaurants, shops, retail stores, transit hubs, etc.). In addition, the contextual information may not take into account any indicators or preferences the user may have that could be related to its context. The ability of the computing device to identify more specific information related to the context of the computing device of the user and to the indicators or preferences of the user can result in providing the user with more relevant contextual information for use by the user. Thus, a need exists for systems, methods, and apparatus to address the shortfalls of present technology and to provide other new and innovative features.

SUMMARY

In one general aspect, a method can include identifying, by a computing device, a geographic proximity of an entity. The method can further include establishing, by the computing device, direct short-range communications with the entity, the computing device and the entity being able to communicate with one another using a short-range communication protocol, receiving, by the computing device, an indication that the computing device shares an identifier with the entity, and receiving, by the computing device, information relevant to the computing device regarding the entity based on the shared identifier.

Example implementations may include one or more of the following features. For instance, the computing device may be a first computing device and the entity may be a second computing device. The shared identifier may be a reminder identifier associated with a reminder set in the first computing device. The short-range communication protocol may be Bluetooth low energy (Bluetooth LE). The entity may be a physical location. The shared identifier may be an identified common interest between a set of interests associated with the computing device and a set of interests associated with the entity.

In another general aspect, a method can include creating a reminder based on receiving a request, from a first computing device, to create the reminder. The method can further include notifying a second computing device of the reminder, receiving, from the second computing device, confirmation that the second computing device will allow proximity communications with the first computing device, and generating a reminder identifier associated with the reminder. The method can still further include providing to the first computing device and the second computing device the reminder identifier in order for the second computing device to broadcast the reminder identifier using a short-range communication protocol, and in order for the first computing device to recognize the broadcasted reminder identifier from the second computing device when direct short-range communications have been established between the first computing device and the second computing device.

Example implementations may include one or more of the following features. For instance, the received request from the first computing device may include information that identifies the second computing device. The short-range communication protocol may be Bluetooth low energy (Bluetooth LE). The first computing device may recognize the broadcasted reminder identifier sent from the second computing device and, based on the recognition, may perform an action on the first computing device.

In another general aspect, a non-transitory, machine-readable medium has instructions stored thereon that, when the instructions are executed by a processor, can cause a computing device to create a reminder based on receiving a request, from a first computing device, to create the reminder, notify a second computing device of the reminder, receive, from the second computing device, confirmation that the second computing device will allow proximity communications with the first computing device, generate a reminder identifier associated with the reminder, and provide to the first computing device and the second computing device the reminder identifier in order for the second computing device to broadcast the reminder identifier using a short-range communication protocol, and for the first computing device to recognize the broadcasted reminder identifier from the second computing device when direct short-range communications have been established between the first computing device and the second computing device.

Example implementations may include one or more of the following features. The received request from the first computing device may include information that identifies the second computing device. The short-range communication protocol may be Bluetooth low energy (Bluetooth LE). The first computing device may recognize the broadcasted reminder identifier from the second computing device and, based on the recognition, may perform an action on the first computing device.

In yet another general aspect, a non-transitory, machine-readable medium has instructions stored thereon that, when the instructions are executed by a processor, can cause a computing device to identify a geographic proximity of an entity, establish direct short-range communications with an entity, the computing device and the entity being able to communicate with one another using a short-range communication protocol, receive an indication that the computing device shares an identifier with the entity, and receive information relevant to the computing device regarding the entity based on the shared identifier.

Example implementations may include one or more of the following features. For instance, the computing device may be a first computing device and the entity may be a second computing device. The shared identifier may be a reminder identifier associated with a reminder set by the first computing device. The short-range communication protocol may be Bluetooth low energy (Bluetooth LE). The entity may be a physical location. The shared identifier may be an identified common interest between a set of interests associated with the computing device and a set of interests associated with the entity.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A computing device can include information related to and about a user of the device, such as a contacts list, a calendar, reminders, notes, etc. The user can install and use various applications that provide information to the user (e.g., a movie listings application, a map application), enjoyment to the user (e.g., a music application), or allow the user to interact with other users (e.g., social networking applications). In addition, the computing device can provide a user with contextual information that may be based on, for example, the physical location of the user and the time of day when the user is at the location.

In addition, the contextual information can be further "fine-tuned" or customized for the user providing them with a more satisfying experience. The computing device can consider other contextual factors such as the identity of the users of computing devices determined to be proximate to the computing device of the user and the proximity of buildings, business, stores, venues, restaurants, hotels, and other physical locations to the computing device of the user. The computing device of the user can use the proximity information along with the information related to and about the user of the computing device to provide a customized experience to the user by delivering to the user relevant information that is important to the user within the current context of the computing device of the user.

Figure 1:
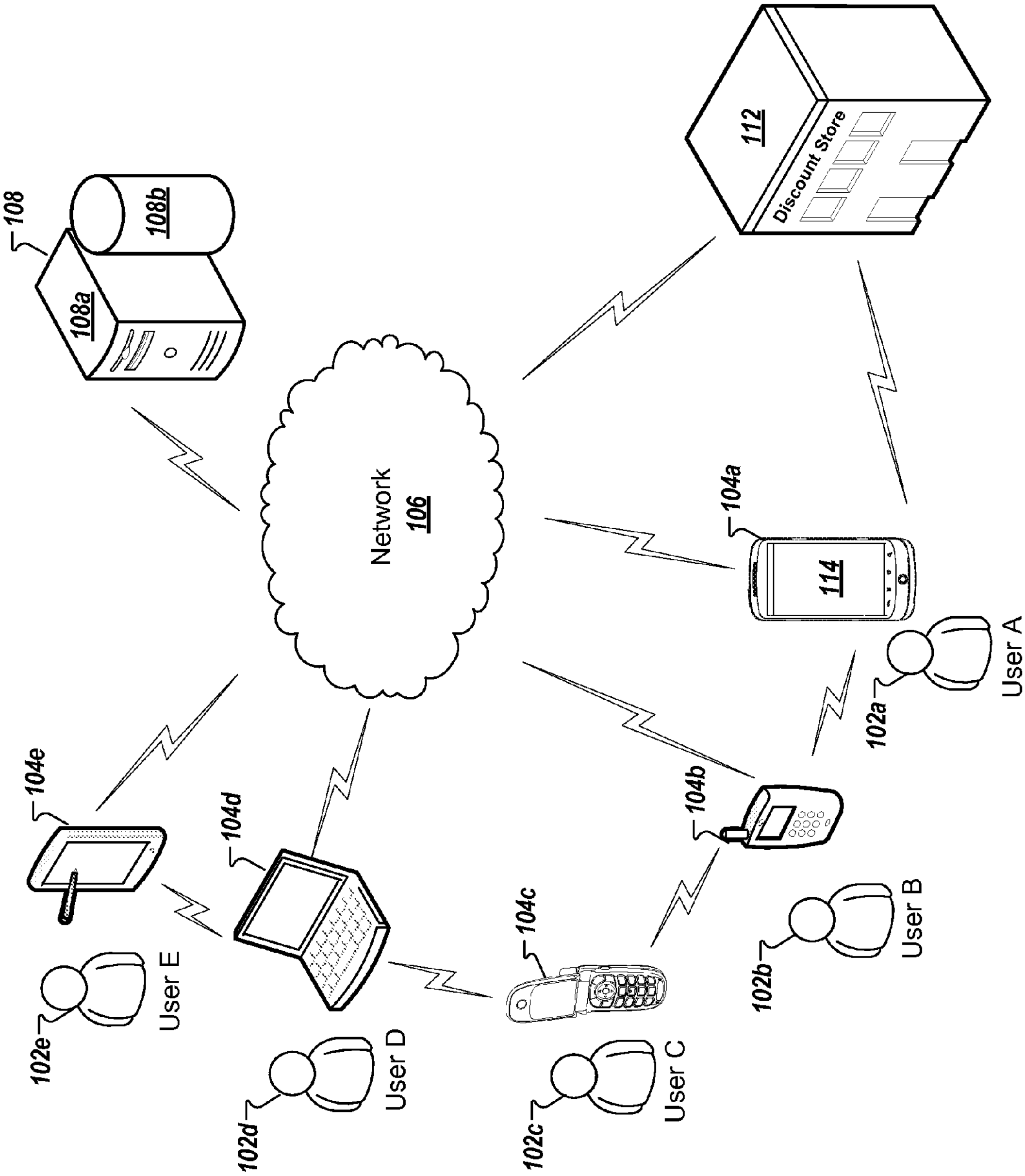
FIG. 1 is a diagram that shows a plurality of users using a variety of computing devices that communicate via a network to a server where each of the computing devices can determine proximity of other computing devices or proximity of physical locations.

FIG. 1 is a block diagram that shows a plurality of users 102*a-e* using a variety of computing devices 104*a-e*, respectively, where each of the computing devices 104*a-e* can determine proximity of other computing devices or proximity of physical locations. In some cases, the other computing devices 104*a-e* can be mobile computing devices used by a user. In some cases, the user may also be mobile (e.g., in a moving vehicle, walking, running) when using the computing device. In other cases, the other computing devices 104*a-e* may be part of or otherwise included in a mobile entity such as a vehicle. In some implementations, each computing device 104*a-e* can use a wireless communication system and protocol for short-range communication (e.g., communicating with one or more proximate computing devices). In addition, each computing device 104*a-e* can use a wireless and/or wired communication system and protocol for long-range communications (e.g., communicating over network 106 with a computer system 108). The computer system 108 can include one or more computing devices (e.g., server 108*a*) and one or more computer-readable storage devices (e.g., database 108*b*).

In some implementations, the computing devices 104*a-e* can be laptop or desktop computers, smartphones, personal digital assistants, portable media players, tablet computers, or other appropriate computing devices that can communicate, using the network 106, with other computing devices or computer systems. In some implementations, the computing devices 104*a-e* can perform client-side operations, as discussed in further detail herein. In some implementations, the computer system 108 can represent more than one computing device working together to perform server-side operations. In some implementations, the network 106 can be a public communications network (e.g., the Internet, cellular data network, dialup modems over a telephone network) or a private communications network (e.g., private LAN, leased lines). In some implementations, the computing devices 104*a-e* can communicate with the network 106 using one or more high-speed wired and/or wireless communications protocols (e.g., 802.11 variations, WiFi, Bluetooth, TCP/IP, Ethernet, IEEE 802.3, etc.).

For example, referring to FIG. 1, a computing device 104*b* can communicate using a wireless and/or wired communication system and protocol for long-range communications with the network 106. For example, the network 106 can be a cellular network that includes multiple cell sites where each site may have a maximum range of up to approximately one-half mile (1600 meters). In some situations, each site may have a maximum range of up to approximately five miles (8000 meters). The computing devices 104*a-e* can communicate wirelessly with the network 106.

In addition, the computing device 104*b* can communicate wirelessly, using a wireless communication system and protocol for short-range communication, with computing device 104*a*. For example, the computing device 104*a* and the computing device 104*b* can establish near field communications (NFC) when the computing device 104*a* and the computing device 104*b* are within centimeters or are in contact with one another. In this example, the computing device 104*a* and the computing device 104*b* include the hardware and software needed to implement NFC. The use of NFC can enable the establishment of short-range (e.g., having a maximum range of less than about four centimeters) communications between the computing device 104*a* and the computing device 104*b*. In some cases, the maximum range of the short-range communications between two NFC enabled computing devices may be greater than four centimeters. In some cases, the maximum range of the short-range communications between two NFC enabled computing devices may be less than four centimeters. On average, however, two NFC enabled computing devices can communicate with one another when they are located less than about four centimeters from each other.

In another example, the computing device 104*a* and the computing device 104*b* can use wireless local area network (WLAN) communication technology standards (e.g., IEEE 802.11 based standards) to communicate with one another. The use of WLAN communication technology standards can enable the establishment of secure short-range (e.g., having a maximum range of less than about 70 meters) communications between the computing device 104*a* and the computing device 104*b*. In some cases, the maximum range of the short-range communications between two WLAN enabled computing devices may be greater than 70 meters. In some cases, the maximum range of the short-range communications between two WLAN enabled computing devices may be less than 70 meters. On average, however, two WLAN enabled computing devices can communicate with one another when they are located less than about 70 meters from each other.

In another example, the computing device 104*a* and the computing device 104*b* can use the Classic Bluetooth wireless technology standard to communicate with one another. The use of Classic Bluetooth can enable the establishment of secure short-range (e.g., having a maximum range of less than about 100 meters) communications between the computing device 104*a* and the computing device 104*b*. In some cases, the maximum range of the short-range communications between two Classic Bluetooth enabled computing devices may be greater than 100 meters. In some cases, the maximum range of the short-range communications between two Classic Bluetooth enabled computing devices may be less than 100 meters. On average, however, two Classic Bluetooth enabled computing devices can communicate with one another when they are located less than about 100 meters from each other.

In another example, Bluetooth Low Energy (Bluetooth LE) can enable the establishment of secure short-range (e.g., having a maximum range of less than about 50 meters) communications between the computing device 104*a* and the computing device 104*b*. In some cases, the maximum range of the short-range communications between two Bluetooth LE enabled computing devices may be greater than 50 meters. In some cases, the maximum range of the short-range communications between two Bluetooth LE enabled computing devices may be less than 50 meters. On average, however, two Bluetooth LE enabled computing devices can communicate with one another when they are located less than about 50 meters from each other.

A computing device using Bluetooth LE can consume less power than a computing device using Bluetooth or other types of wireless communication systems and protocols. It may be advantageous, therefore, when a computing device's power may be limited (e.g., it operates on a battery) to use Bluetooth LE. In cases where a Bluetooth LE enabled computing device may be frequently "searching" for other Bluetooth LE enabled devices (e.g., the Bluetooth LE capability of the computing device is always on or active), power consumption can be an issue in order for the frequent searching to not drain the battery of the computing device.

Referring to FIG. 1, the computing devices 104*a-e* can be configured to communicate using a wireless and/or wired communication system and protocol for long-range communications with the network 106. In addition or in the alternative, the computing devices 104*a-e* can be configured to communicate wirelessly, using a wireless communication system and protocol for short-range communication, with one or more other computing devices (e.g., computing devices 104*a-e* can communicate with one another). The users 102*a-e* of the computing devices 104*a-e*, respectively, can enable or disable the short-range communication capabilities of the respective computing devices 104*a-e*.

For example, the computing device 104*b* can "discover" the computing device 104*a* when the computing device 104*a* is within the range (e.g., 50 meters) of the short-range communication system utilized by both the computing device 104*a* and the computing device 104*b*. Once discovered, the computing device 104*a* can provide information to and/or exchange information with the computing device 104*b*. The information can be based on the context of the computing device 104*a* and the computing device 104*b* (e.g., the location of the computing devices 104*a-b*) along with information about each of the computing devices 104*a-b* (e.g., the user 102*a* owns the computing device 104*a* and the user 102*b* owns the computing device 104*b*).

A user can allow (consent to) short-range communications between a computing device it owns and/or operates and another computing device owned and/or operated by another user. Referring to FIG. 1, the user 102*a* can allow short-range communications between the computing device 104*a* and the computing device 104*b* that is owned and/or operated by the user 102*b*. For example, the user 102*a* of computing device 104*a* can indicate on the computing device 104*a* that the computing device 104*a* can perform an action on the computing device 104*a* when it is in proximity to the computing device 104*b* of the user 102*b*. The computing device 104*a*, using the network 106, can communicate the indication of the action to the computer system 108. The server 108*a* can store the indication of the action in the database 108*b*. In addition, the computer system 108 can communicate with the computing device 104*b*, using the network 106, informing the computing device 104*b* that the user 102*a* of the computing device 104*a* is interested in communicating with the user 102*b* of the computing device 104*b* when the user 102*a* and the user 102*b* are in proximity to one another (the computing device 104*a* and the computing device 104*b* are in proximity to each other). If the user 102*b* allows (consents to) short-range communications between the computing device 104*b* and the computing device 104*a*, then the computing device 104*b* can communicate back to the computer system 108, using the network

106, that the computing device 104*b* will allow short-range communications with the computing device 104*a*.

The computer system 108 can generate a unique identifier associated with the indication of the action provided to the computer system 108 by the computing device 104*a*. The computer system 108 can communicate, using the network 106, with the computing device 104*a* and the computing device 104*b* and provide each computing device 104*a-b* with the identifier. As such, the computing device 104*a* and the computing device 104*b* know the unique identifier for the indicated action that the computing device 104*a* can perform when it is in proximity to the computing device 104*b* (the user 102*a* is in proximity to the user 102*b*). The computing device 104*b* can then "broadcast", using a protocol for the wireless short-range communication system it is configured to use, the unique identifier. The computing device 104*a* can "listen", using a protocol for the wireless short-range communication system it is configured to use (which is the same wireless short-range communication system the computing device 104*b* is configured to use), for the unique identifier.

When computing device 104*b* is in proximity to the computing device 104*a* (user 102*b* is in proximity to user 102*b*), the computing device 104*b* and the computing device 104*a* can "wake up" (e.g., transition out of a sleep or reduced power mode) and proceed to "recognize" each other (e.g., the computing devices 104*a-b* communicate with one another using the wireless short-range communication system). The computing device 104*a* acknowledges that a unique identifier received from computing device 104*b* is the same as a unique identifier known by the computing device 104*a*. Based on this acknowledgement, the computing device 104*a* performs the action associated with the unique identifier.

The above example describes short-range communications between the computing device 104*a* and computing device 104*b*. Short-range communications, however, can also be established among any of the computing devices 104*a-e* in a similar manner.

In some implementations, a user (e.g., user 102*a*) may own and/or operate multiple computing devices (e.g., the computing device 104*a* and the computing device 104*d*) that may share information with one another and/or be synchronized to one another. For example, referring to FIG. 1, user 102*a* and user 102*d* may be the same user. The user 102*a*, using the computing device 104*d*, can indicate on the computing device 104*d* that the computing device 104*a* can perform an action on the computing device 104*a* when it is in proximity to the computing device 104*b* of the user 102*b*. In addition or in the alternative, the user 102*a*, using the computing device 104*d*, can indicate on the computing device 104*d* that either or both of the computing devices 104*d* and 104*a* can perform an action on each respective computing device 104*d* and 104*a* when either or both of the computing devices 104*d* and 104*a* are in proximity to the computing device 104*b* of the user 102*b*.

Referring to FIG. 1, each of the computing devices 104*a-e* can be considered a type of entity where each of the computing devices 104*a-e* can be configured to communicate wirelessly, using a wireless communication system and protocol for short-range communication, with one another. In addition or in the alternative, the computing devices 104*a-e* can be configured to communicate wirelessly, using a wireless communication system and protocol for short-range communication, with an additional entity, entity 112. For example, an entity 112 and a computing device 104*b* can "discover" each other when the computing device 104*b* is within the range (e.g., 50 meters) of a short-range communication system utilized by both the computing device 104*b* and the entity 112. Once discovered, the entity 112 can provide information to and/or exchange information with the computing device 104*b*.

The information can be based on user-related data such as preferences, reminders, and/or other types of data associated with the user 102*b*. In addition or in the alternative, the information can be based on the context (e.g., location and time) of the computing device 104*b* of the user 102*b* and the entity 112 when the short-range communication between the computing device 104*b* and the entity 112 is established. The computing device 104*b* can provide the user-related data to the computer system 108 for storage in the database 108*b* (e.g., in a user table) in association with the computing device 104*b* for the user 102*b* for possible future access by one or more entities. The user-related data and the computing device 104*b* can each be associated with a unique user identification code for the user 102*b* that is maintained by the computer system 108. In addition, the database 108*b* can store information related to and associated with the entity 112 (e.g., in an entity table).

When the computing device 104*b* is in proximity to the entity 112 (the computing device 104*b* is within the range (e.g., 50 meters) of the short-range communication system utilized by both the computing device 104*b* and the entity 112), the entity 112 can "recognize" the computing device 104*b*. For example, the user 102*b* with the computing device 104*b* may enter a building for the entity 112, or the user 102*b* with the computing device 104*b* may be proximate to a specific location for the entity 112. Using a short-range communication system and protocol, the computing device 104*b* can broadcast the unique user identification code associated with the computing device 104*b*. The entity 112, when the computing device 104*b* is within the range of the short-range communication system, can receive the unique identification code for the computing device 104*b*. The entity 112 can communicate with the computer system 108, using the network 106, in order to provide the computer system 108 with the received broadcasted unique user identification code associated with the computing device 104*b*. The computer system 108 can determine one or more common interests between user-related data and entity-related data. For example, the computer system 108 can determine similar and/or common entries in a user-related data table and an entity-related data table. In another example, the computer system 108 can use interest graphs for the user-related data and the entity-related data in order to determine one or more common interests between the user 102*b* and the entity 112.

The entity 112 can provide information to the computing device 104*b* related to the determined common data between the user-related data and the entity-related data and the context (e.g., location and time) of the computing device 104*b* of the user 102*b* and the context of the entity 112 when the computing device 104*b* is proximate to the entity 112. The computing device 104*b* can provide the information to the user 102*b*, for example, by displaying a message on a display portion 114 of the computing device 104*b*. In some cases, when the user 102*b* receives the message, the user 102*b* can indicate that they accept the information provided by the entity 112. In some cases, when the computing device 104*b* displays the message (and, in particular, if this is the first time the computing device 104*b* has received communications of any sort from the entity 112 on the computing device 104*b*), the user 102*b* can decide not to allow the entity 112 to provide information to the computing device

104*b*. For example, the computing device 104*b* can provide an indication to the entity 112 to not allow any communications with the entity 112 when the computing device 104*b* receives a selection of an associated option in a user interface displayed on the display portion 114 of the computing device 104*b*.

In some implementations, a computing device (e.g., one of the computing devices 104*a-e*) and an entity are configured to communicate with one another using a short-range communication system and protocol. In addition, however, the computing device and the entity may not be capable of long-range communications with a network (e.g., the network 106). The entity and the computing device may be at a location that does not allow or is unable to provide long-range communications with a network.

In these implementations, the entity and the computing device can "discover" each other when the computing device is within the range (e.g., 50 meters) of a short-range communication system utilized by both the computing device and the entity. Once discovered, the entity can provide information to and/or exchange information with the computing device, the information based on the context (e.g., location and time) of the entity and the computing device.

When the computing device is in proximity to the entity (the computing device is within the range (e.g., 50 meters) of the short-range communication system utilized by both the computing device and the entity), the entity can "recognize" the computing device and provide context-relevant information to the computing device. The computing device can provide the information to a user (e.g., user 102*b*) of the computing device (e.g., computing device 104*b*), for example, by displaying a message on a display portion (e.g., display portion 114) of the computing device (e.g., computing device 104*b*).

In some cases, when the user receives a particular message from the entity, the user can indicate that they consent to receiving further information related to the entity at a time in the future when the user may no longer be in proximity to the entity. The computing device can save (store locally on the computing device) an indication of the consent to receive further communications related to the entity. At a time in the future when the computing device (e.g., computing device 104*b*) can access a network (e.g., network 106), the computing device, using the network, can communicate the indication of the action to a computer system (e.g., computer system 108). A server (e.g., server 108*a*) included in the computer system can store the indication of the consent to receive further communications related to the entity in a database (e.g., database 108*b*), associating the database entry with a unique user identification code for the user of the computing device. In addition, or in the alternative, the computer system can inform a server hosted by the entity that the user of the computing device, identified by the unique user identification code, consented to receive further communications related to the entity.

At a time in the future, and/or at a predetermined time interval that begins in the future (e.g., weekly, monthly, every Friday afternoon), the server hosted by the entity can send a communication (e.g., Short Message Service (SMS) message, electronic mail (email) message, etc.) to the computing device of the user using long-range communications with a network. The sending of the communication to the user by the server hosted by the entity can be based on a unique user identification code for the computing device of the user and the past indication by the user consenting to the receipt of further communications related to the entity. In this case, the previously identified proximity of the computing device of the user to the entity can result in the computing device of the user receiving future communications from a server hosted by the entity. The received future communications can provide information to the computing device of the user related to the entity even if the user (and the computing device of the user) is not proximate to the entity at the time when the computing device of the user receives the communications.

Figure 2A:
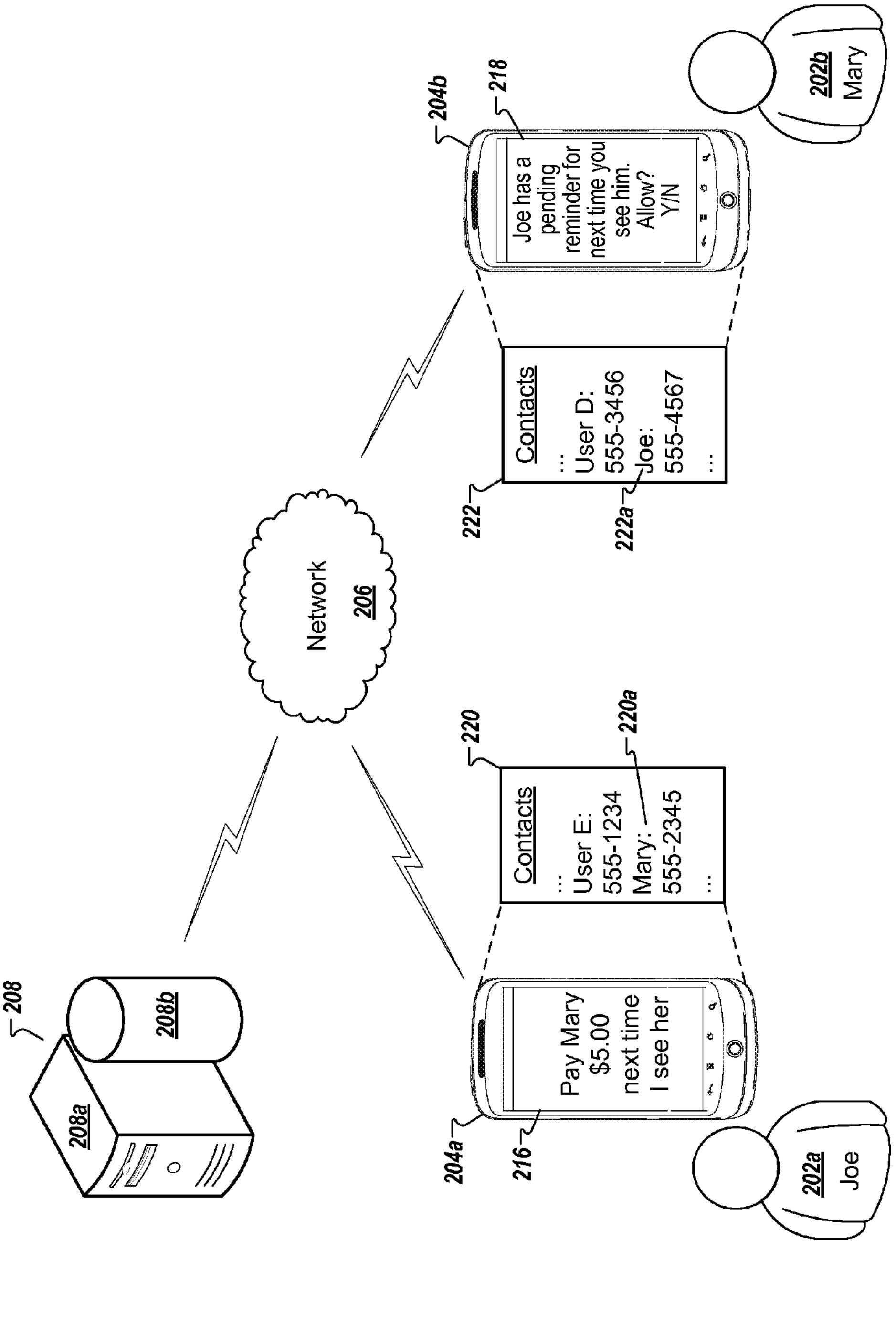
FIGS. 2A-B are diagrams illustrating an example implementation of a proximity reminder provided to a computing device.
Figure 2B:
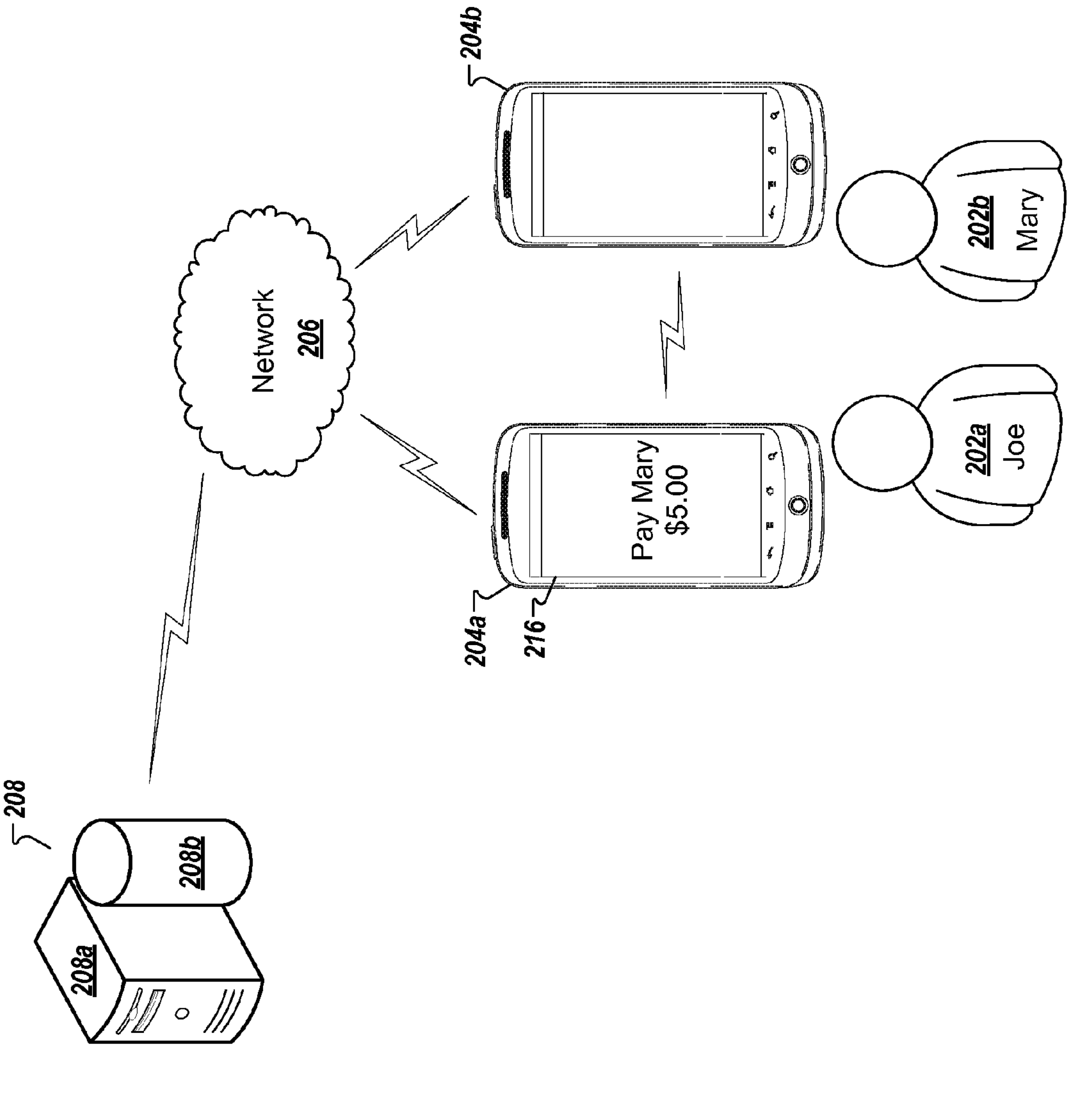

FIGS. 2A-B are diagrams illustrating an example implementation of a proximity reminder provided to a computing device 204*a*. The computing devices 204*a* and a computing device 204*b* can be configured to communicate using a wireless and/or wired communication system and protocol for long-range communications with the network 206. In addition or in the alternative, the computing device 204*a* and the computing device 204*b* can be configured to communicate wirelessly, using a wireless communication system and protocol for short-range communication, with one another.

Referring to FIG. 2A, a user 202*a* (Joe) can set a reminder on the computing device 204*a* to "pay Mary $5.00 next time I see her." The user 202*a* is associated with the computing device 204*a* (e.g., the user 202*a* owns the computing device 204*a*). A user 202*b* (Mary) is associated with the computing device 204*b* (e.g., the user 202*b* owns the computing device 204*b*). In another example, a service provider may register a user to a computing device though another user may actually own the computing device. In this case, the registered user is the user associated with the computing device.

The setting of the reminder indicates that when the computing device 204*a* (and the user 202*a*) is determined to be proximate to the computing device 204*b* (and user 202*b*) that the reminder be displayed on a display portion 216 of the computing device 204*a* reminding user 202*a* (Joe) that he needs to pay user 202*b* (Mary) five dollars. The computing device 204*a* can identify contact or other information for the user 202*b* in order to identify the user 202*b*. For example, the computing device 204*a* can determine contact information for the user 202*b* from contact information stored in a contacts list 220 on the computing device 204*a*. In some cases, the contact list for the user 202*a* may be stored in a database 208*b* of the computer system 208. In another example, a social networking service used by the user 202*a* can provide the contact information for the user 202*b*. In some cases, the social networking service can store the contact information locally on the computing device 204*a*. In some cases, the social networking service can store the contact information for the user 202*a* in a database 208*b* of the computer system 208.

The computing device 204*a*, using the network 206, can communicate a request to the computer system 208 to create a pending reminder for user 202*a* that is based on a detected proximity of the computing device 204*b* of the user 202*b* (a proximity-based reminder). The computer system 208 can communicate with the computing device 204*b* by way of network 206 to inform the computing device 204*b* that the user 202*a* of the computing device 204*a* has set a proximity-based reminder. For example, the computing device 204*b* can display a message to the user 202*b* on a display portion 218 of the computing device 204*b* indicating the user 202*a* (Joe) has set a pending proximity-based reminder.

The user 202*b* can decide to allow (consent to) or not allow (not consent to) the proximity-based reminder alerting the computing device 204*a* of the user 202*a* when the computing device 204*b* of the user 202*b* is proximate to the computing device 204*a*. In some cases, the decision of the user 202*b* can be for all proximity-based communications between the computing device 204*a* and the computing device 204*b*. In other cases, the decision of the user 202*b* can be for a single, one-time proximity-based communication between the computing device 204*a* and the computing device 204*b*. In these other cases, the user 202*b* may be prompted to allow or not allow a proximity-based communication each time such a communication could occur between the computing device 204*a* and the computing device 204*b*.

In one example, the computer system 208 receives from the computing device 204*b*, using the network 206, the decision of the user 202*b* to not allow proximity-based communications with computing device 204*a* and user 202*a*. The computer system 208 can send a message to the computing device 204*a* using the network 206. The computing device 204*a* can display in the display portion 216 of the computing device 204*a* to the user 202*a* the message indicating that the computing device 204*b* of the user 202*b* does not wish to partake in proximity-based communications with the computing device 204*a* of the user 202*a*.

In another example, the computer system 208 receives from the computing device 204*b* the decision of the user 202*b* to allow proximity-based communications with computing device 204*a* and user 202*a*. The server 208*a* can generate a proximity reminder identifier associated with the proximity-based reminder received from the computing device 204*a*. The server 208*a* can store, in the database 208*b*, the proximity reminder identifier with the proximity-based reminder in association with the computing device 204*a* and the user 202*a*. The computer system 208, using the network 206, can send the proximity reminder identifier to both the computing device 204*a* and the computing device 204*b*. The computing device 204*b*, using short-range communications (e.g., using Bluetooth LE), broadcasts the proximity reminder identifier. In addition, the computing device 204*a*, using short-range communications (e.g., using Bluetooth LE), listens for broadcasts. When the computing device 204*a* is determined to be in proximity to the computing device 204*b* (e.g., the computing device 204*a* and the computing device 204*b* are within the range of the short-range communication system (e.g., the computing device 204*a* and the computing device 204*b* are within 50 meters of each other)), both the computing device 204*a* and the computing device 204*b* will "wake up" (e.g., the computing device 204*a* "hears" the broadcast of the proximity reminder identifier from the computing device 204*b*).

Referring to FIG. 2B, the computing device 204*a* confirms with the computing device 204*b* that the computing device 204*a* has received the broadcasted proximity reminder identifier and is the targeted recipient of the proximity reminder identifier. The computing device 204*a* and the computing device 204*b* acknowledge that they are in possession of the same proximity reminder identifier. Based on the confirmation and acknowledgement, the computing device 204*a* displays a reminder to the user 202*a* (Joe) on the display portion 216 of the computing device 204*a* to "pay Mary $5.00."

In the cases where the user 202*b* decides to allow (consents to) all proximity-based communications between the computing device 204*a* and the computing device 204*b*, the user 202*b* can also have the option of changing the decision at any time to not allow (not consent to) all proximity-based communications between the computing device 204*a* and the computing device 204*b*. For example, the computing device 204*b* can provide a user interface that can be accessed by the user 202*b* to allow the user 202*b* to indicate that they want to not allow further proximity-based communications between the computing device 204*a* and the computing device 204*b*.

In another example, referring to FIGS. 2A-B, the user 202*a* and the user 202*b* may share common interests. Data related to the interests for the user 202*a* and data related to the interests for the user 202*b* can be stored in the database 208*b* in association with each user 202*a-b* and each computing device 204*a-b*, respectively. In some implementations, an association can be made between the user 202*a* and the user 202*b* based on each user's contact information being included in the other user's contact list. For example, an entry 220*a* for the user 202*b* is in the contact list 220 stored on the computing device 204*a*, and an entry 222*a* for the user 202*a* is in a contact list 222 stored on the computing device 204*b*. Based on the association of the users 202*a-b*, the computer system 208 can determine one or more common interests between the users 202*a-b*. For example, the computer system 208 can form a shared interest graph by comparing the data related to the interests of user 202*a* with the data related to the interests of user 202*b*. The computer system 208 can determine that shared data between the data related to the interests of the user 202*a* and the data related to the interests of the user 202*b* is the viewing Tom Cruise movies. The computer system 208 can determine, using the data related to the interests of the user 202*a*, that user 202*a* recently purchased movie tickets on-line for a Tom Cruise movie. The computer system 208 can determine, using the data related to the interests of the user 202*b*, that the user 202*b* recently rented on-line a Tom Cruise movie.

Also, as described, the computing device 204*a* and the computing device 204*b* are capable of short-range communications (e.g., each computing device 204*a-b* is a Bluetooth LE enabled computing device). Each computing device 204*a-b* can broadcast an identifier associated with the respective computing device that the other computing device can receive and acknowledge, enabling communication between the computing devices 204*a-b*, where the communication is indicative of a determined proximity of the computing device 204*b* to the computing device 204*a*.

For example, the user 202*a* and the user 202*b* may each make use of an intelligent personal assistant hosted on their respective computing devices 204*a-b*. Each computing device 204*a-b* can receive the data related to the common interests of the user 202*a* and the user 202*b* in the form of an electronic card sent by the computer system 208 to each of the computing devices 204*a-b*. The computing device 204*a* can present to the user 202*a* information relevant to the data related to the common interests of the user 202*a* and the user 202*b*. The user 202*a* can access the intelligent personal assistant on the computing device 204*a* when in determined proximity to the computing device 204*b* for the user 202*b*, in order for the user 202*a* to determine what movies may be playing at the local movie theatres. The computing device 204*a* can present the user 202*a* with an electronic card showing times for a Tom Cruise movie at a local movie theater based on the common interest in Tom Cruise movies shared by the user 202*a* of the computing device 204*a* and the user 202*b* of the proximate computing device 204*b*.

Figure 3A:
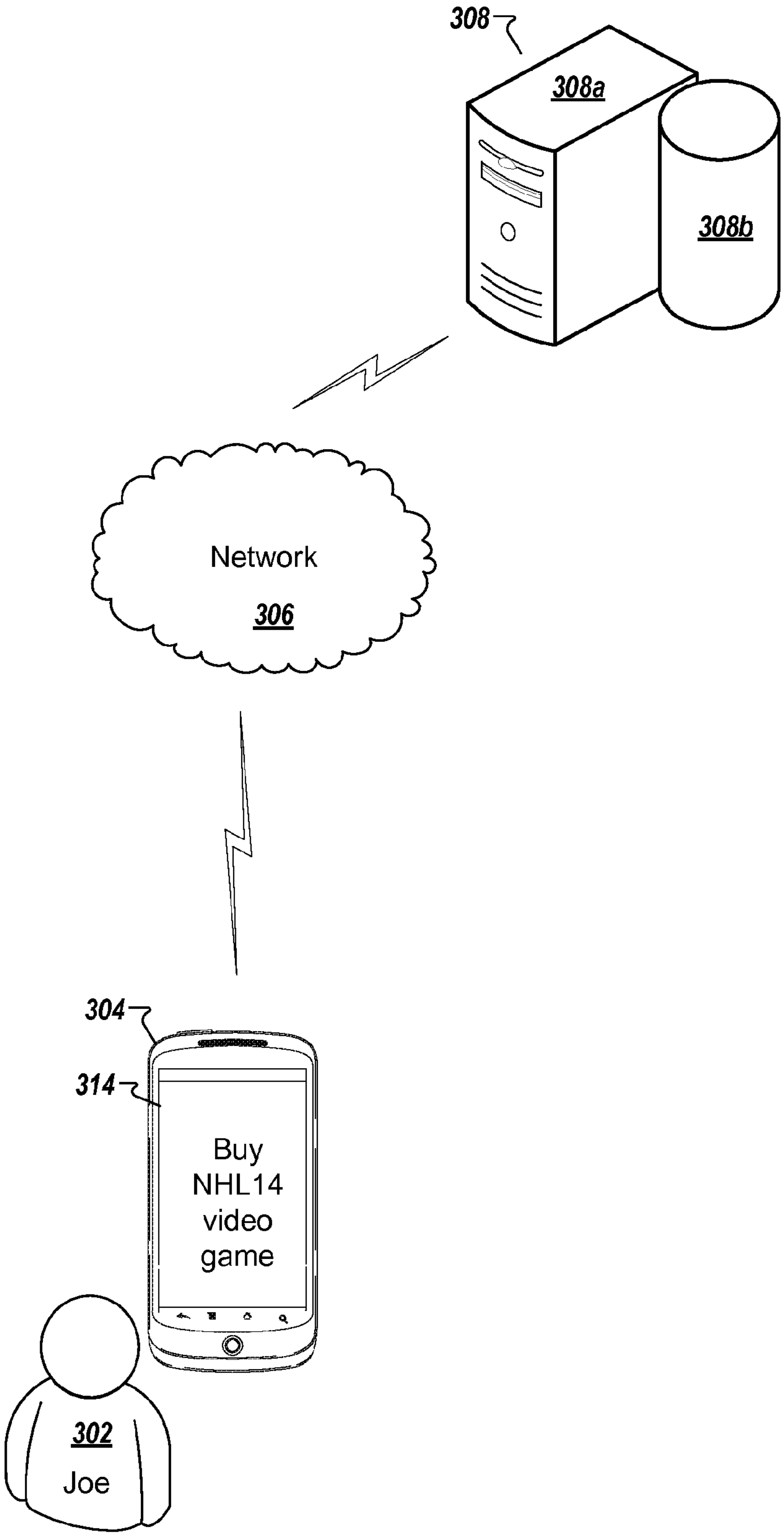
FIGS. 3A-B are diagrams illustrating an example implementation of proximity relevant information provided to a computing device.
Figure 3B:
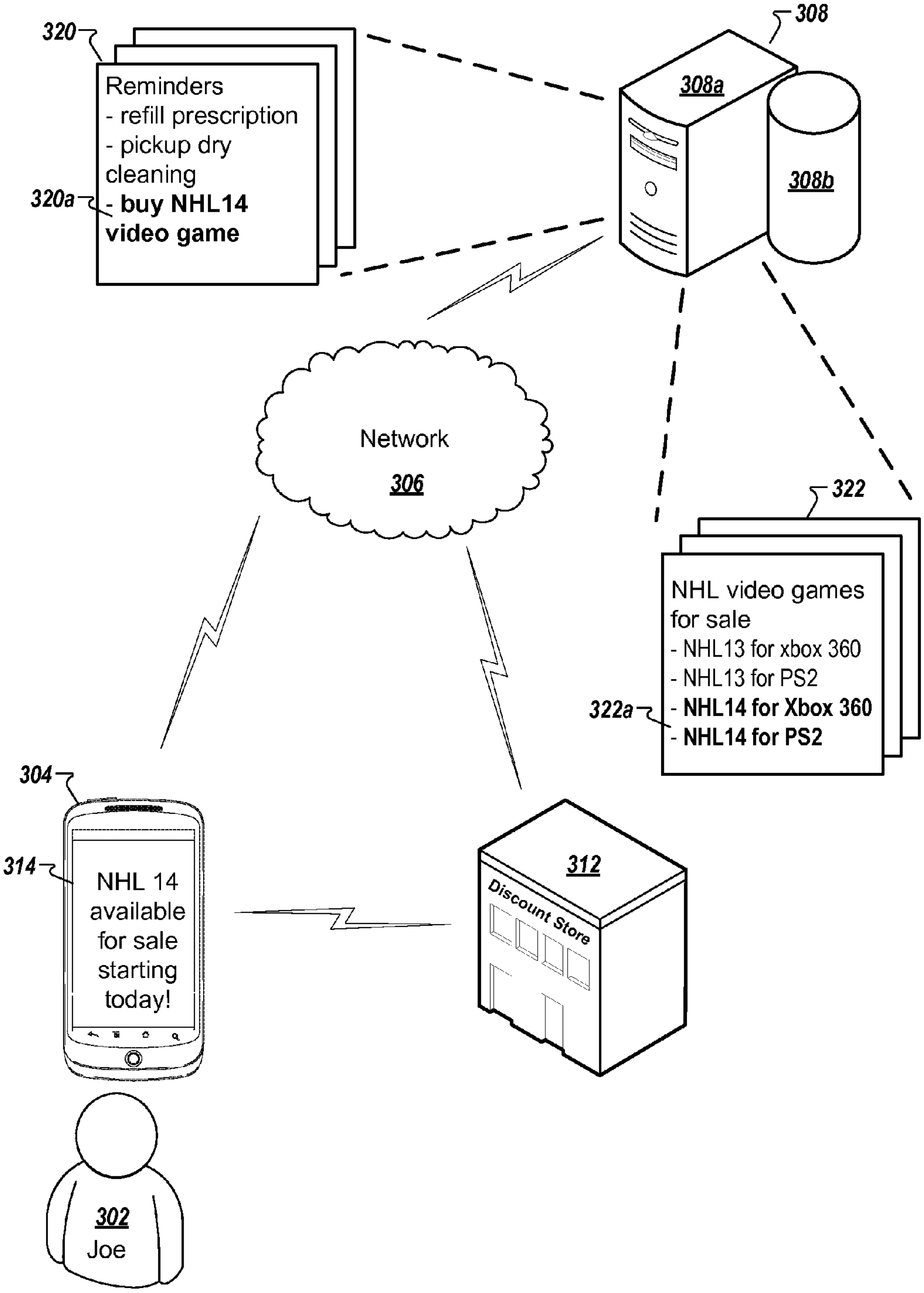

FIGS. 3A-B are diagrams illustrating an example implementation of proximity relevant information provided to a computing device 304. The computing device 304 can be configured to communicate using a wireless and/or wired communication system and protocol for long-range communications with the network 306.

Referring to FIG. 3A, a user 302 (Joe) can set a reminder on the computing device 304 to "Buy NHL14 video game."

The user 302 is associated with the computing device 304. For example, the user 302 can own the computing device 304 or the computing device 304 can be registered to the user 302. The setting of the reminder indicates that when the computing device 304 (and the user 302) is determined to be proximate to an entity that may sell the NHL14 video game, the reminder can be displayed on a display portion 314 of the computing device 304 reminding the user 302 (Joe) to buy the NHL14 video game. The computing device 304, using the network 306, can communicate a request to the computer system 308 to create a reminder 320*a* for the user 302 to buy the NHL14 video game for sale. In addition, the computer system 308 can associate a proximity reminder identifier with the reminder 320*a*. The computer system 308 can store the reminder 320*a* and its associated identifier in a table or list of reminders 320 associated with the user 302 and the computing device 304. The reminders 320 can be stored in the database 308*b*. In addition, the computer system 308 can store other information and data about the interests of the user 302 in association with the computing device 304. The additional information and data can be stored in the database 308*b*.

Referring to FIG. 3B, the computing device 304 and entity 312 are capable of short-range communications (e.g., the computing device 304 is a Bluetooth LE enabled computing device and the entity 312 includes one or more Bluetooth LE enabled beacons). The computing device 304 can broadcast an identifier associated with the computing device 304 that the one or more beacons included in the entity 312 can receive, enabling bi-directional short-range communications between the computing device 304 and each of the one or more beacons included in the entity 312.

The computing device 304, using short-range communications (e.g., using Bluetooth LE), broadcasts the identifier associated with the computing device 304. The one or more beacons included in the entity 312 use short-range communication systems and protocols (e.g., Bluetooth LE) to "listen" for broadcasts from short-range communication (e.g., Bluetooth LE) enabled computing devices. The computing device 304 is determined to be in proximity to a beacon included in the entity 312 (e.g., the computing device 304 is in proximity to the entity 312) when the computing device 304 and the beacon included in the entity 312 are within the range of the short-range communication system (e.g., the computing device 304 and the beacon included in the entity 312 are within 50 meters of one another)).

When the proximity of the computing device 304 to the beacon included in the entity 312 is determined, the entity 312 may further communicate with the computer system 308 using the network 306 to determine if there are any shared interests between the entity 312 and the user 302 based on the received identifier associated with the computing device 304. For example, the server 308*a* can access information for the entity 312 related to the interests of the entity 312 (e.g., entity data 322 stored in the database 308*b*). In addition, the server 308*a* can access information associated with the computing device 304 related to interests of the user 302 (e.g., the reminders 320 stored in the database 308*b*). For example, the computer system 308 can generate a shared interest graph by comparing the information associated with the computing device 304 and related to interests of the user 302 (e.g., the reminders 320) with the interests of the entity 312, stored as entity data 322. The computer system 308 can determine that the computing device 304 has a reminder 320*a* set to buy the NHL14 video game and the entity 312 (based on the entity data 322) has the NHL14 video game currently available for sale.

Based on determining the shared interest of the user 302 and the entity 312 (e.g., the reminder 320*a* related to the purchase of the NHL14 video game and the entity data 322 indicating that the entity 312 is currently selling the NHL14 video game), the entity 312, using the short-range communications, can send an indication to the computing device 304 that the entity 312 has the NHL14 video game currently available for sale. The computing device 304 can display the indication that the entity 312 has the NHL14 video game currently available for sale to the user 302 by displaying a message on a display portion 314 of the computing device 304.

In some implementations, the user 302 can choose to ignore any communications received from the entity 312. The user 302 can make the choice when the computing device 304 receives a first communication from the entity 312. The user 302 can make the choice on a one-time basis (ignore a single communication) for each received communication. In addition or in the alternative, the user 302 can make the choice on a semi-permanent basis, allowing the user 302 to choose to ignore all communications received from the entity 312 by the computing device 304 when the computing device 304 receives a communication from the entity 312, but also allowing the user 302 to alter the choice later, at a time when no communication is received from the entity.

In another example, when the proximity of the computing device 304 to the beacon included in the entity 312 is determined, the entity 312 communicates with the computer system 308, using the network 306, to determine if there are any shared interests between the entity 312 and the user 302. The computer system 308 can determine one or more shared interests between the entity 312 and the user 302 based on the identifier received from and associated with the computing device 304. The computer system 308 can determine a shared interest of the user 302 and the entity 312 based on records of previous purchases made by the user 302 and stored in a records database for the user 302 that can be included in the database 208*b*. The user 302 may have recently purchased tickets on an on-line ticket-purchasing website to see a Star Wars movie in a theater. The server 308*a* can access information for the entity 312 related to the interests of the entity 312 (e.g., entity data 322 stored in the database 308*b*). The computer system 308 can determine that the computing device 304 of the user 302 was used to purchase tickets on an on-line ticket-purchasing website to see a Star Wars movie and the entity 312 (based on the entity data 322) currently has the Star Wars Trilogy collection available for sale on DVD and BluRay. Based on determining the shared interest of the user 302 and the entity 312 (e.g., Star Wars movies), the entity 312, using the short-range communications, can send an indication to the computing device 304 regarding the promotion about the entity 312 having the Star Wars Trilogy collection available for sale on DVD and BluRay. The computing device 304 can display the promotion to the user 302 by displaying a message on a display portion 314 of the computing device 304.

In all cases, a user (e.g., user 302) can set one or more options or controls on the computing device (e.g., the computing device 304) of the user that can block and/or not allow the computing device to broadcast or otherwise provide an identifier associated with the computing device to other computer systems or other computing devices that may communicate with, using either short-range or long-range communications, the computing device of the user. In these cases, the user may not experience proximity-based reminders or other types of proximity based interactions as described herein.

Figures 4A, 4B, 4C:
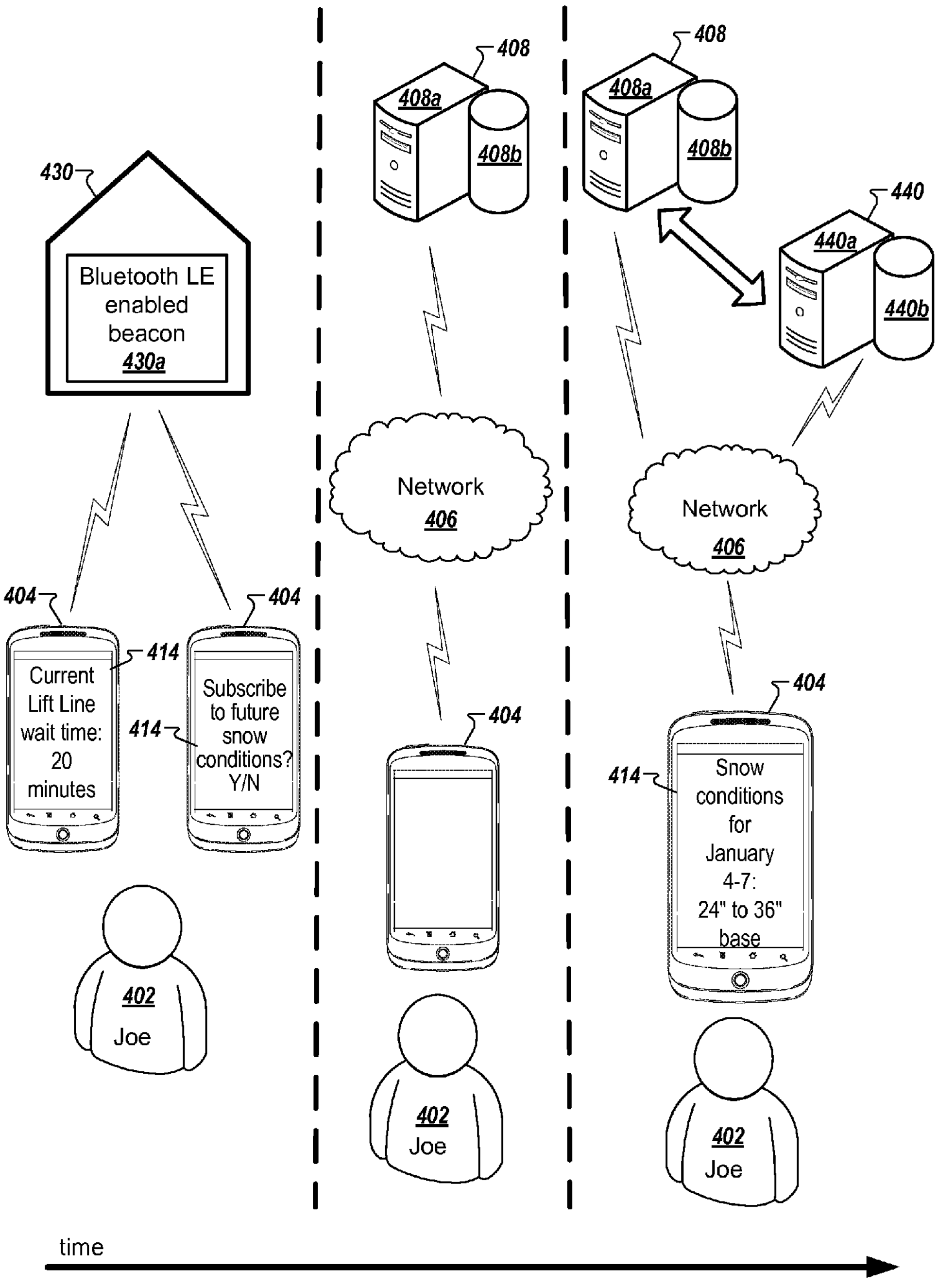
FIGS. 4A-C are diagrams illustrating an example implementation of the use of past proximity data of a computing device when providing future relevant information to the computing device.

FIGS. 4A-B are diagrams illustrating an example implementation of the use of past proximity data of a computing device 404 when providing future relevant information to the computing device 404. Referring to FIG. 4A, a Bluetooth LE enabled computing device 404 and a Bluetooth LE enabled beacon 430*a* included in an entity 430 are capable of short-range communications. The computing device 404 can broadcast an identifier associated with the computing device 404 that the Bluetooth LE enabled beacon 430*a* can receive, enabling bi-directional communication between the computing device 404 and the Bluetooth LE enabled beacon 430*a*. In the example of FIG. 4A, the computing device 404 and the entity 430 may not use a wireless and/or wired communication system and protocol for long-range communications with a network. For example, the entity 430 and the computing device 404 may be located in a geographical location where there is no network service (e.g., the top of a mountain at a ski resort).

The Bluetooth LE enabled beacon 430*a* included in the entity 430 broadcasts information associated with the entity 430. The computing device 404, using Bluetooth LE that is enabled on the computing device 404, "listens" for broadcasts from other Bluetooth LE enabled beacons and computing devices.

When the computing device 404 determines that it is in proximity to the Bluetooth LE enabled beacon 430*a* included in the entity 430 (e.g., the computing device 404 is located within the short-range communication range of the Bluetooth LE enabled beacon 430*a* (e.g., the computing device 404 is within 50 meters of the Bluetooth LE enabled beacon 430*a*)), the computing device 404 can receive the broadcasted information from Bluetooth LE enabled beacon 430*a*. The computing device 404 can display the received broadcasted information to a user 402 (Joe) on a display portion 414 of the computing device 404. For example, Joe may be waiting in a lift line at a ski resort, where the location of the computing device 404 and the entity 430 preclude long-range communications with a network. The computing device 404 can receive lift line wait times from a Bluetooth LE enabled beacon 430*a* when the computing device 404 is proximate to the Bluetooth LE enabled beacon 430*a*. The computing device 404 can display the lift line wait times to the user 402 on the display portion 414 of the computing device 404.

The ability of the computing device 404 and the Bluetooth LE enabled beacon 430*a* of the entity 430 to establish short-range communications can result in providing the user 402 with proximity-based context information. The computing device 404 can receive information for display to the user 402 on the display portion 414 of the computing device 404 that is related to the current location and time of day of the computing device 404 of the user 402.

In addition, once short-range communications are established between the Bluetooth LE enabled beacon 430*a* and the computing device 404, the Bluetooth LE enabled beacon 430*a* can send a message to the computing device 404 for display to the user 402 (Joe) on the display portion 414 of the computing device 404. The message can request if the user 402 would like to allow the receipt of future communications related to the entity 430. In some cases, the user 402 may allow (consent to) receiving future communications related to the entity 430. The consent to receive further communications related to the entity 430 can be stored locally on the computing device 404 for further upload to a computer system 408 when the computing device 404 of the user 402 can establish long-range communications with the computer system 408. In some cases, the user 402 may not allow (not consent to) receiving future communications related to the entity 430. The refusal to receive future communications from the entity 430 may also be stored locally on the computing device 404.

Referring to FIG. 4B, the user 402 can be located at a geographical location where wireless and/or wired communication systems and protocols for long-range communications with a network 406 are enabled. For example, the computing device 404 is now located outside of the ski resort in a geographical location (e.g., the home of the user 402) where network service is available. When the computing device 404 determines that it can communicate with the network 406, the computing device 404 can send to the computer system 408 using the network 406 the consent to receive future communications related to the entity 430. A server 408*a* can store the consent in the database 408*b* in association with the computing device 404 for the user 402 and in association with the entity 430.

Referring to FIG. 4C, the entity 430 can host a computer system 440 (e.g., server 440*a* and database 440*b*) that can provide communications (e.g., Short Message Service (SMS) messages, electronic mail (email) messages, etc.) related to the entity 430 to computing devices using the network 406. The computer system 440 can identify computing devices whose users have indicated and/or enabled such communications between the computer system 440 and the computing devices. For example, the computer system 440 can communicate with the computer system 408 to determine that the computing device 404 will allow receipt of communications from the entity 430.

Figure 5:
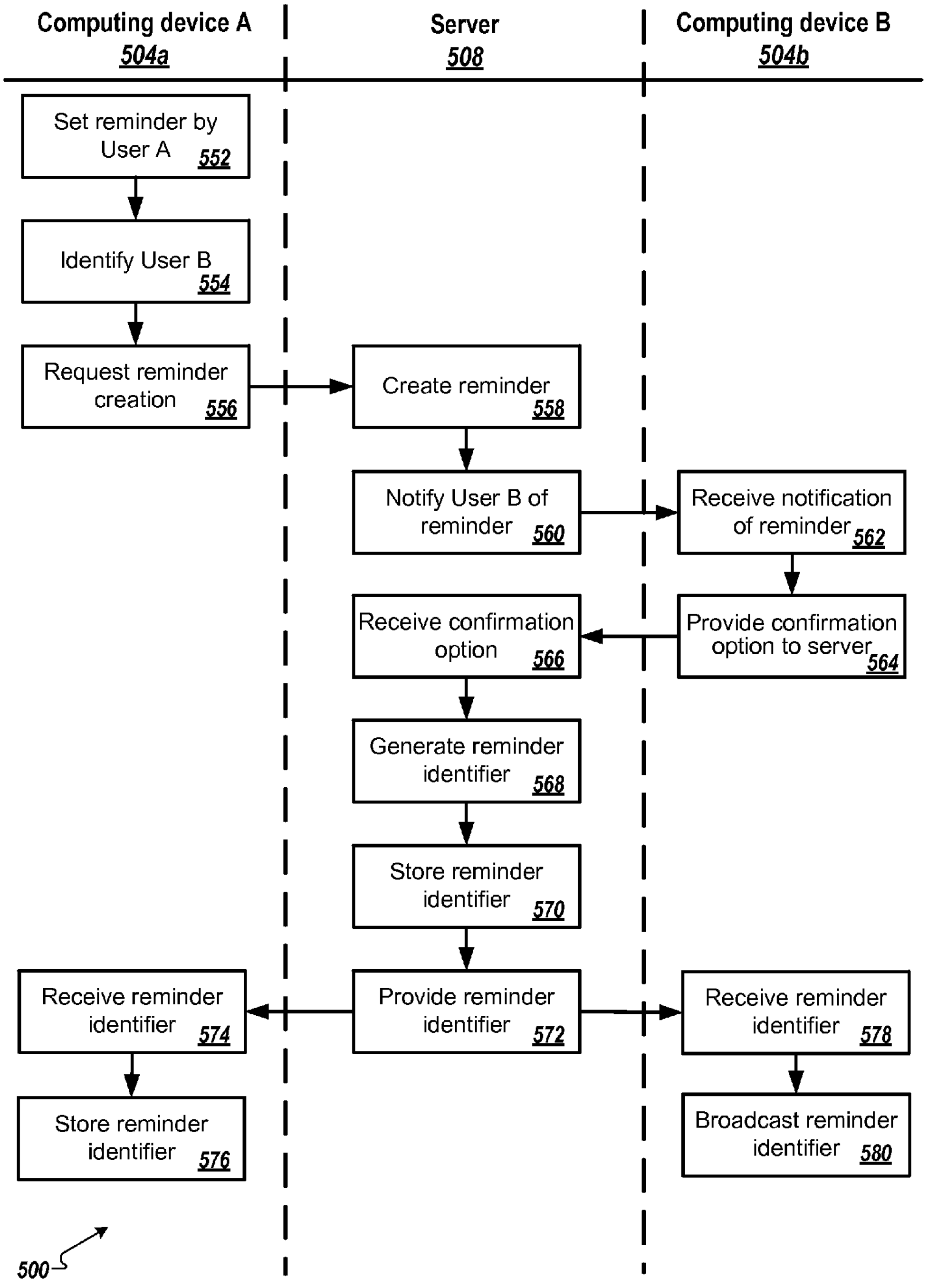
FIG. 5 is a swim lane diagram illustrating an example process for implementing a proximity reminder.

At a time when the computing device 404 of the user 402 is not in proximity to the entity 430, and/or at a predetermined time interval (e.g., weekly, monthly, every Friday afternoon), the computer system 440 can send a communication (e.g., Short Message Service (SMS) message, electronic mail (email) message, etc.) to the computing device 404 of the user 402 using the network 406. The sending of the communication to the user by the computer system 440 can be based on a unique user identification code for the computing device 404 of the user 402 and the past indication and/or enablement of the receipt of further communications by the computing device 404 that are related to the entity 430. In this case, the previously identified proximity of the computing device 404 of the user 402 to the entity 430 can result in the computing device 404 of the user 402 receiving information related to the entity 430 even if the user 402 (and the computing device 404) is not proximate to the entity 430 at the time when the computing device 404 of the user 402 receives the communications FIG. 5 is a swimlane diagram illustrating an example process 500 for implementing a proximity reminder. The process 500 can be executed by the described systems and computing devices described with reference to FIGS. 1, 2A-B, 3A-B, and 4A-C.

In the example process 500, a device 504*a* and a device 504*b* can communicate with a server 508. The device 504*a*, the device 504*b*, and the server 508 can use a wireless and/or wired communication system and protocol for long-range communications with a network accessible by the device 504*a*, the device 504*b*, and the server 508.

A reminder can be set by a user (user A) of a computing device 504*a* (device A) (block 552). A user (user B) associated with the reminder can be identified (block 554). For example, the user A can set a reminder on the computing device 504_a_ to perform a particular action on the computing device 504_a_ when the computing device 504_a_ is in proximity to a computing device 504_b_ of the user B. The computing device 504_a_ can determine the identity of the user B (e.g., determine contact information for the computing device 504_b_ of the user B that may be stored locally on the computing device 504_a_). A request to create the reminder is sent by the computing device 504_a_ to the server 508 (block 556). The request can include the particular action the computing device 504_a_ will perform when the computing device 504_a_ is determined to be in proximity to the computing device 504_b_ of the user B along with the determined contact information for the computing device 504_b_ of the user B.

The reminder is created (block 558). Once the reminder is created, a notification regarding the creation of the reminder is sent by the server 508 to the computing device 504_b_ (block 560). The computing device 504_b_ receives the notification regarding the reminder (block 562). For example, the computing device 504_b_ of a user B can receive a message for display on a display portion of the computing device 504_b_. The message can inform user B that user A wishes to establish short-range communications between the computing device 504_a_ of user A and the computing device 504_b_ of user B when the computing device 504_a_ is in proximity to the computing device 504_b_.

A confirmation option is sent to the server 508 by the computing device 504_b_ (block 564). For example, the user B allows (consents to) the establishing of short-range communication between the computing device 504_a_ of user A and the computing device 504_b_ of user B. The server 508 receives the confirmation option from the computing device 504_b_ (block 566). Based on receiving a confirmation to establish short-range communications between the computing device 504_a_ of user A and the computing device 504_b_ of user B, the server 508 generates a reminder identifier (block 568). The reminder identifier is associated with the reminder created by the server 508 and stored by the server 508 (block 570). For example, the server 508 can store reminders for the user A (and associated identifiers for the reminders) in a database accessible by the server 508.

The server 508 sends the reminder identifier to the computing device 504_a_ (block 572). The computing device 504_a_ receives the reminder identifier (block 574). The computing device 504_a_ stores the reminder identifier locally on the computing device 504_a_ (block 576). The computing device 504_a_ can use the stored reminder identifier to confirm short-range communications with a computing device (e.g., the computing device 504_b_) that broadcasts the same reminder identifier.

The server 508 also sends the reminder identifier to the computing device 504_b_ (block 572). The computing device 504_a_ receives the reminder identifier (block 578). The computing device 504_a_ broadcasts the reminder identifier (block 574). The computing device 504_a_ can broadcast the reminder identifier using a short-range communication system and protocol that can be also used by the computing device 504_a_.

Figure 6:
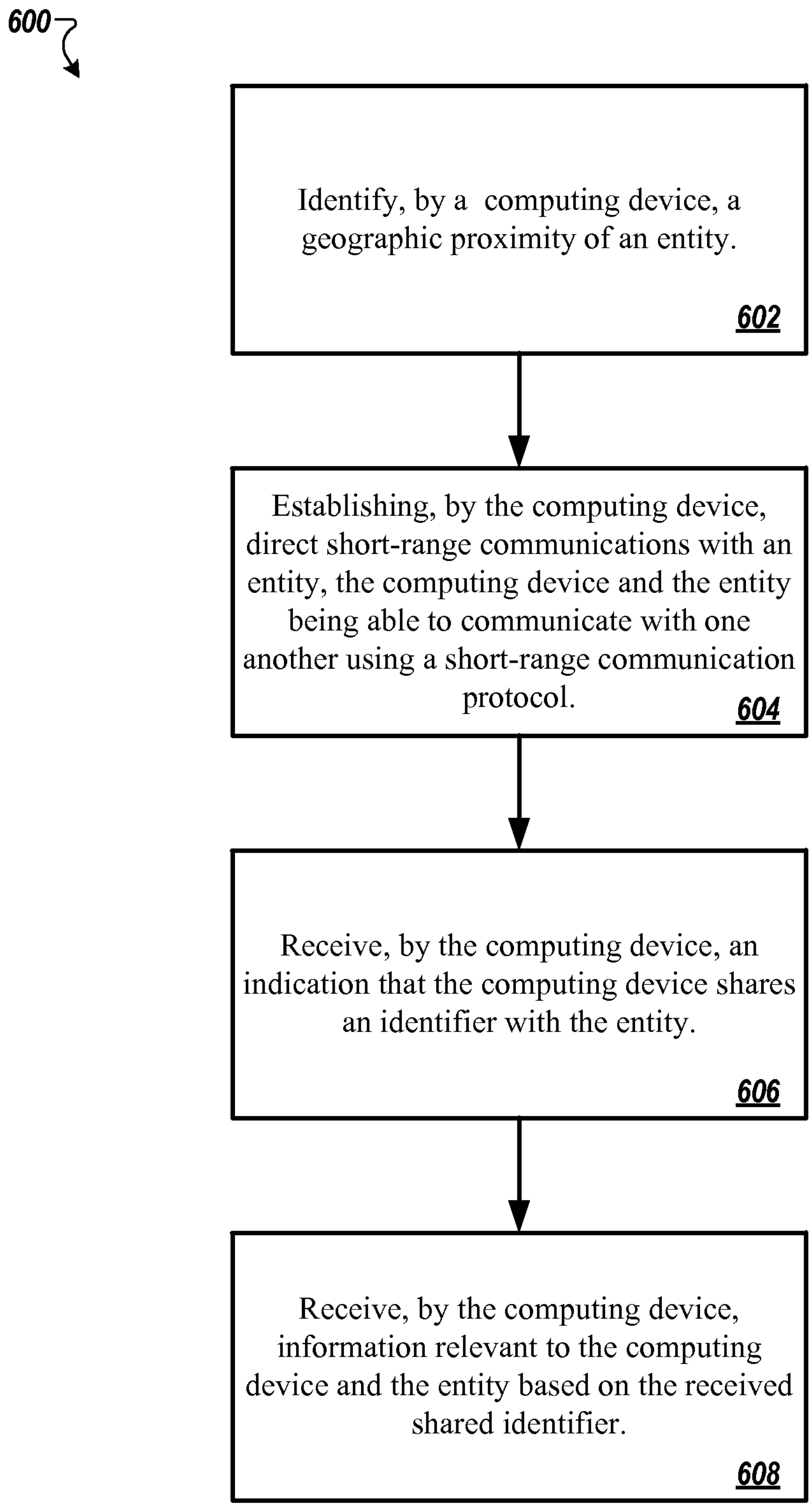
FIG. 6 is a flowchart that illustrates a method for providing relevant information to a computing device based on proximity to an entity.

FIG. 6 is a flowchart that illustrates a method 600 for providing relevant information to a computing device based on proximity to an entity. In some implementations, the method 600 can be implemented by the computer systems and computing devices described herein. For example, the method 600 can be implemented by the computer systems and computing devices discussed with reference to FIG. 1.

The method 600 begins by identifying, by a computing device, a geographic proximity of an entity (block 602). The computing device establishes direct short-range communications with the entity, the computing device and the entity being able to communicate with one another using a short-range communication protocol (block 604). For example, the computing device 104_b_ and the entity 112 can each be enabled to communicate using a protocol whose maximum range is less than one hundred meters (e.g., the computing device 104_b_ is Bluetooth LE enabled and the entity 112 includes a Bluetooth LE enabled beacon). The computing device 104_b_ can determine when it is in proximity to the entity 112 when short-range communications (using a protocol whose maximum range is less than one hundred meters) are established between the computing device 104_b_ and the Bluetooth LE enabled beacon included in the entity 112.

In another example, the computing device 104_b_ and the computing device 104_a_ can each be enabled to communicate using a protocol whose maximum range is less than one hundred meters (e.g., the computing device 104_b_ and the computing device 104_a_ are each Bluetooth LE enabled). The computing device 104_b_ can determine when it is in proximity to the computing device 104_a_ when short-range communications (using a protocol whose maximum range is less than one hundred meters) are established between the computing device 104_b_ and the computing device 104_a_.

The computing device can receive an indication that the computing device shares an identifier with the entity (block 606). For example, the Bluetooth LE enabled beacon included in the entity 112 can receive a unique identification code associated with the computing device 104_b_ from the computing device 104_b_. The entity 112 can provide the unique identification code to the computer system 108. The computer system 108 can determine a shared identifier based on interest data associated with the computing device 104_b_ that is in common with interest data associated with the entity.

In another example, the computing device 104_a_ can receive an identifier associated with the computing device 104_b_ from the computer system 108. The computing device 104_a_ can broadcast the received identifier, which the computing device 104_b_ can be receive and recognize.

The computing device can receive information relevant to the computing device and the entity based on the received shared identifier (block 608). For example, the computing device 104_b_ can receive information related to the availability for sale by the entity 112 of a product based on a reminder set by the user of the computing device 104_b_ to purchase the product.

In another example, the computing device 104_b_ can receive a reminder to pay money owed to the user 102_a_ of the computing device 104_a_ based on an identifier for a reminder shared by the computing device 104_a_ and the computing device 104_b_.

Figure 7:
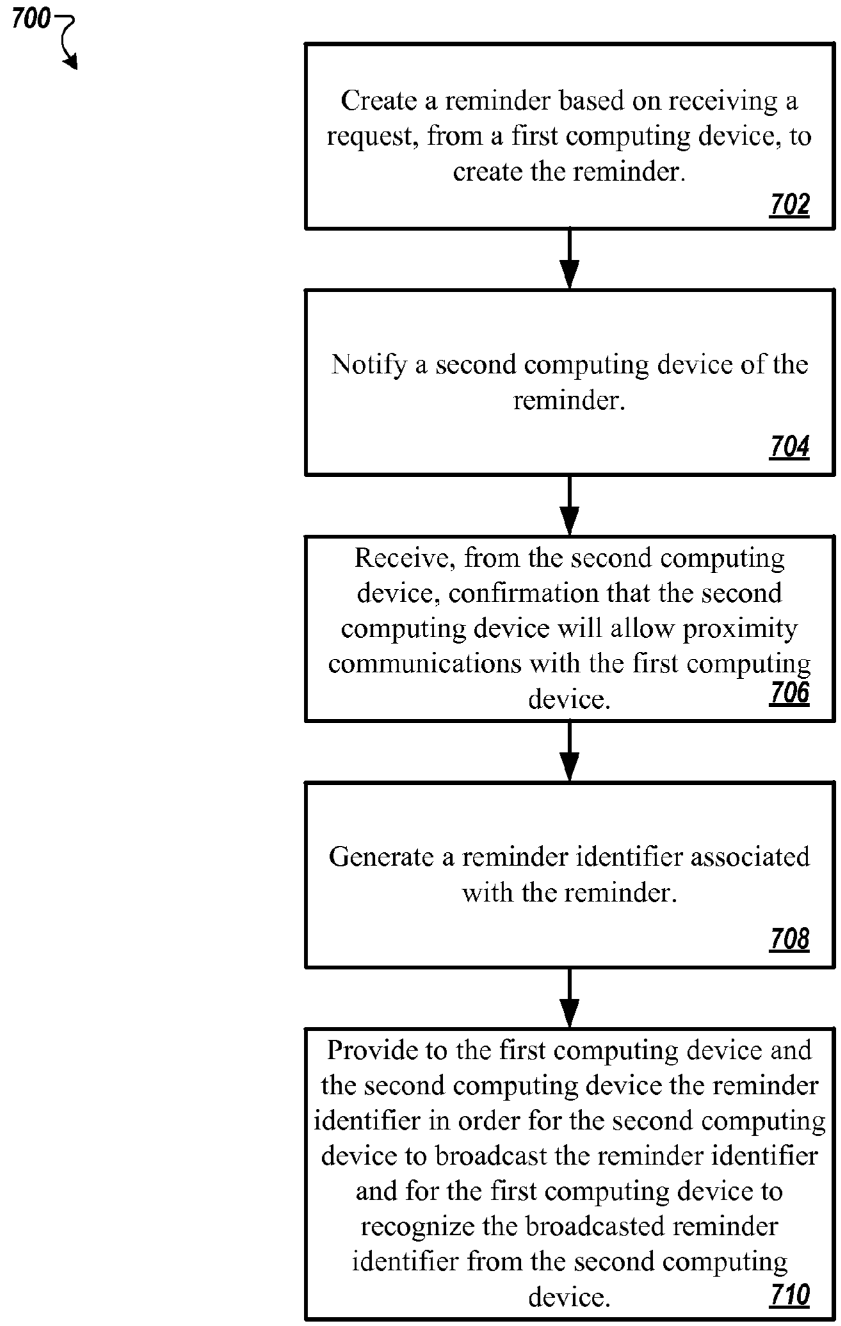
FIG. 7 is a flowchart that illustrates a method of determining and providing a proximity reminder.

FIG. 7 is a flowchart that illustrates a method 700 of determining and providing a proximity reminder. In some implementations, the method 700 can be implemented by the computer systems and computing devices described herein. For example, the method 700 can be implemented by the computer systems and computing devices discussed with reference to FIG. 1.

The method 700 begins by creating a reminder based on receiving a request, from a first computing device, to create the reminder (block 702). For example, the computer system 108 receives a request from the computing device 104_b_ to create a reminder to write a check for the rent when the computing device 104_b_ (the user 102_b_) is in proximity to the computing device 104_a_ (the user 102_a_).

A second computing device is notified of the reminder (block 704). For example, the computer system 108 notifies the computing device 104*a* that the computing device 104*b* has created a proximity reminder associated with the computing device 104*a* (and the user 102*a*). A confirmation that the second computing device will allow proximity communications with the first computing device is received from the second computing device (block 706). For example, the computing device 104*a* allows (consents to) short-range communications with the computing device 104*b*. The computing device 104*a* provides the confirmation to the computer system 108.

A reminder identifier associated with the reminder is generated (block 708). For example, the computer system 108 generates a reminder identifier and associates the reminder identifier with the reminder and the computing device 104*b* of the user 102*b*.

The reminder identifier is provided to the first computing device and the second computing device in order for the second computing device to broadcast the reminder identifier and for the first computing device to recognize the broadcasted reminder identifier from the second computing device (block 710). For example, the computer system 108 provides the reminder identifier to the computing device 104*a* and the computing device 104*b*. The computing device 104*a* broadcasts the reminder identifier using a short-range communication system and protocol. The computing device 104*b*, enabled to use the same short-range communication system and protocol used by the computing device 104*a*, receives and recognizes the broadcasted reminder identifier when the computing device 104*b* is in proximity to the computing device 104*a*.

Figure 8:
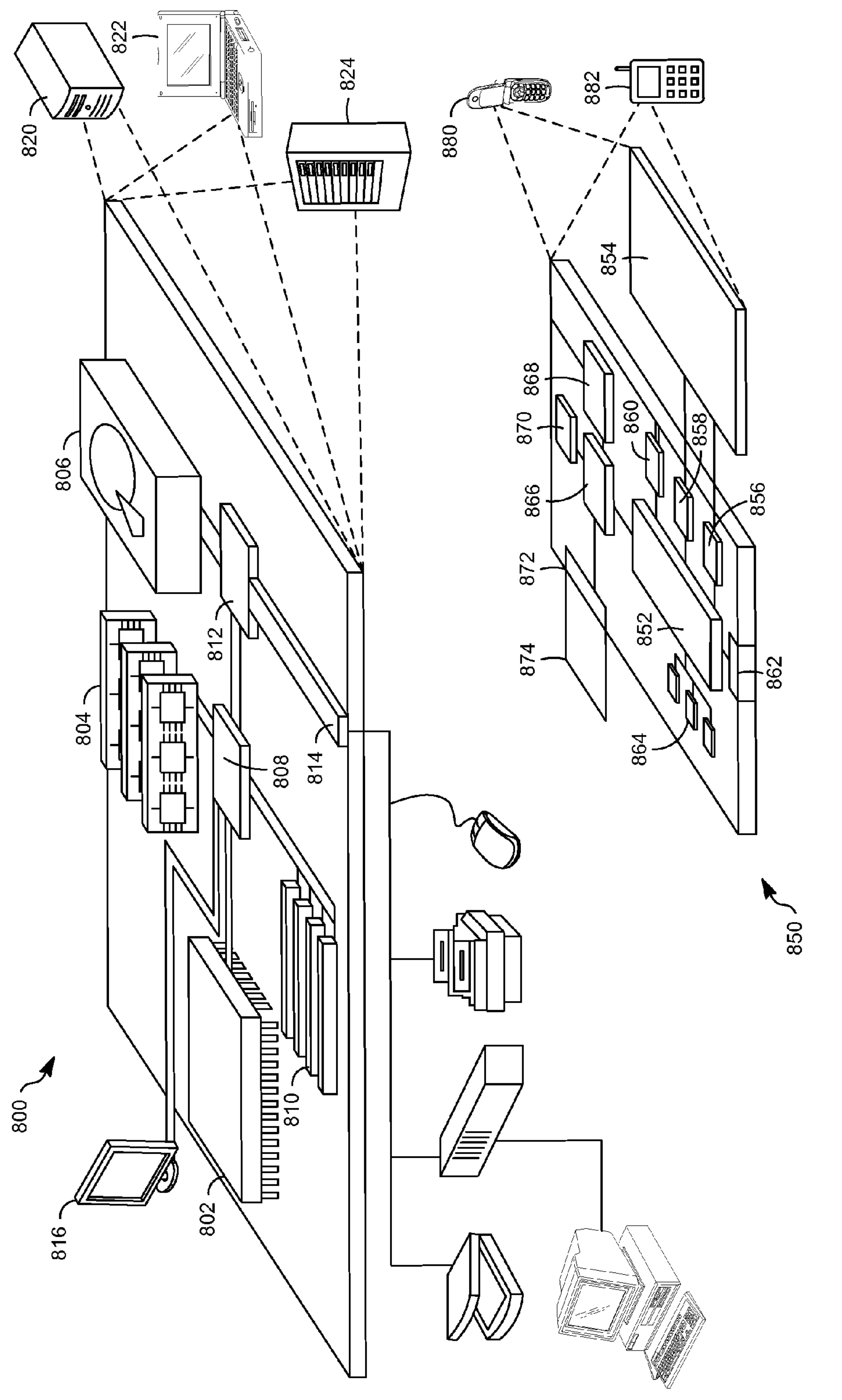
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Bluetooth LE, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Bluetooth LE, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:

providing, by a computing device to a computer system by way of a network, a reminder for a user of the computing device and an identifier for the computing device, the computer system including the reminder in association with the identifier in a list of reminders for the user, the list of reminders and associated identifiers being stored in a first database included in the computer system;

establishing, by the computing device with a beacon located in an entity, direct short-range communications with the beacon using a Bluetooth low energy (Bluetooth LE) communication protocol;

providing, by the computing device to the beacon located in the entity, the identifier for the computing device;

receiving, by the computing device from the beacon located in the entity, information relevant to the reminder, the receiving of the information being in response to the computer system:

receiving, from the entity by way of the network, the identifier for the computing device;

using the identifier to determine that entity data stored in a second database is related to the reminder stored in the list of reminders in the first database, the determining being based on forming a shared interest graph by comparing reminders included in the list of reminders stored in the first database with the entity data stored in the second database; and generating, by the computing device, a message for display on the computing device using the information received from the entity.

2. The method of claim 1, wherein determining that the entity data stored in the second database is related to the reminder stored in the list of reminders in the first database includes determining that data included in the stored reminder is also included in the entity data.

3. The method of claim 1, wherein the reminder includes information about the message for display on the computing device.

4. The method of claim 1, wherein the entity data includes items for sale by the entity.

5. The method of claim 4, wherein the entity data includes an availability of a particular item for sale by the entity, and wherein the reminder includes an interest in the user in the particular item.

6. The method of claim 1, wherein the generating of the message for display on the computing device is performed in response to the computing device being within direct short-range communication with the beacon located in the entity.

7. A method, comprising:

receiving, by a computer system from a first computing device by way of a network, a request to create a reminder for a first user of the first computing device, the request specifying contact information for a second computing device for a second user;

notifying, by the computer system using the contact information for the second computing device by way of the network, the second computing device of the request received from the first computing device;

receiving, by the computer system from the second computing device by way of the network, confirmation from the second computing device that the second user consented to allowing direct short-range communication between the second computing device and the first computing device;

generating, by the computer system in response to receiving the confirmation from the second computing device, an identifier;

storing, by the computer system in a database, the reminder and the identifier in association with the reminder, the storing based on the second user consenting to allow direct short-range communication between the second computing device and the first computing device; and providing, by the computer system by way of the network, the identifier associated with the reminder to the first computing device and to the second computing device based on the second user consenting to allow direct short-range communication between the second computing device and the first computing device, the second computing device being configured to broadcast the identifier associated with the reminder using a Bluetooth low energy (Bluetooth LE) short-range communication protocol, the first computing device being configured to recognize the identifier associated with the reminder broadcasted from the second computing device in response to the second computing device being within direct short-range communication with the first computing device, and the first computing device being configured to display, on a display device included in the first computing device, a message including information related to the reminder based on the first computing device recognizing the identifier associated with the reminder that was broadcasted from the second computing device.

8. The method of claim 7, wherein the received request from the first computing device to create the reminder includes the contact information for the second computing device.

9. The method of claim 7, wherein the contact information for the second computing device is included in the database.

10. A non-transitory, machine-readable medium having instructions stored thereon, the instructions, when executed by a processor, cause a computer system to:

receive, from a first computing device by way of a network, a request to create a reminder for a first user of the first computing device, the request specifying contact information for a second computing device for a second user;

notify, using the contact information for the second computing device by way of the network, the second computing device of the request received from the first computing device;

receive, from the second computing device by way of the network, confirmation from the second computing device that the second user consented to allowing direct short-range communication between the second computing device and the first computing device;

generate, in response to receiving the confirmation from the second computing device, an identifier;

store, in a database, the reminder and the identifier in association with the reminder, the storing based on the second user consenting to allow direct short-range communication between the second computing device and the first computing device; and provide, by way of the network, the identifier associated with the reminder to the first computing device and to the second computing device based on the second user consenting to allow direct short-range communication between the second computing device and the first computing device, the second computing device being configured to broadcast the identifier associated with the reminder using a Bluetooth low energy (Bluetooth LE) short-range communication protocol, the first computing device being configured to recognize the identifier associated with the reminder broadcasted from the second computing device in response to the second computing device being within direct short-range communication with the first computing device, and the first computing device being configured to display, on a display device included in the first computing device, a message including information related to the reminder based on the first computing device recognizing the identifier associated with the reminder that was broadcasted from the second computing device.

11. The non-transitory, machine-readable medium of claim 10, wherein the received request from the first computing device to create the reminder includes the contact information for the second computing device.

12. The non-transitory, machine-readable medium of claim 10, wherein the contact information for the second computing device is included in the database.

13. A non-transitory, machine-readable medium having instructions stored thereon, the instructions, when executed by a processor, cause a computing device to:

provide, by the computing device to a computer system by way of a network, a reminder for a user of the computing device and an identifier for the computing device, the computer system; including the reminder in association with the identifier in a list of reminders for the user, the list of reminders being stored in a first database included in the computer system;

broadcast, by the computing device, the identifier for the computing device, the identifier for use in determining if entity data stored in a second database included in the computer system is related to the reminder stored in the list of reminders in the first database;

establish, by the computing device with a beacon located in an entity, direct short-range communications with the beacon using a Bluetooth low energy (Bluetooth LE) communication protocol;

provide, by the computing device to the beacon located in the entity, the identifier for the computing device;

receive, by the computing device from the beacon located in the entity, information relevant to the reminder, the receiving of the information in response to the computer system:

receiving, from the entity by way of the network, the identifier for the computing device, and using the identifier to determine that entity data stored in the second database is related to the reminder stored in the list of reminders in the first database, the determining being based on forming a shared interest graph by comparing reminders included in the list of reminders stored in the first database with the entity data stored in the second database; and generate, by the computing device, a message for display on the computing device using the information received from the entity.

14. The non-transitory, machine-readable medium of claim 13, wherein determining the entity data stored in the second database is related to the reminder stored in the list of reminders in the first database includes determining that data included in the stored reminder is also included in the entity data.

15. The non-transitory, machine-readable medium of claim 13, wherein the entity data includes items for sale by the entity.

16. The non-transitory, machine-readable medium of claim 15, wherein the entity data includes an availability of a particular item for sale by the entity, and wherein the reminder included an interest in the user in the particular item.

17. The non-transitory, machine-readable medium of claim 13, wherein generating of the message for display on the computing device is performed in response to the computing device being within direct short-range communication with the beacon located in the entity.

18. The non-transitory, machine-readable medium of claim 13, wherein the reminder includes information about the message for display on the computing device.

* * * * *